(12) United States Patent
Rubin

(10) Patent No.: US 11,185,965 B2
(45) Date of Patent: Nov. 30, 2021

(54) OPTICIAN'S TOOL AND METHOD FOR REMOVING OR INSERTING LENSES

(71) Applicant: Bionic Thumb Tools LLC, Voorhees, NJ (US)

(72) Inventor: Bruce Rubin, Voorhees, NJ (US)

(73) Assignee: Bionic Thumb Tools LLC, Voorhees, NJ (US)

( * ) Notice: Subject to any disclaimer, the term of this patent is extended or adjusted under 35 U.S.C. 154(b) by 104 days.

(21) Appl. No.: 16/621,828

(22) PCT Filed: Jun. 20, 2018

(86) PCT No.: PCT/US2018/038475
§ 371 (c)(1),
(2) Date: Dec. 12, 2019

(87) PCT Pub. No.: WO2018/236984
PCT Pub. Date: Dec. 27, 2018

(65) Prior Publication Data
US 2020/0183191 A1   Jun. 11, 2020

Related U.S. Application Data

(60) Provisional application No. 62/522,955, filed on Jun. 21, 2017.

(51) Int. Cl.
*B25B 27/00* (2006.01)
*G02C 13/00* (2006.01)
(Continued)

(52) U.S. Cl.
CPC .............. *B25B 27/00* (2013.01); *B25B 27/02* (2013.01); *B25J 15/0033* (2013.01);
(Continued)

(58) Field of Classification Search
CPC ......... B25B 27/00; B25B 27/02; B25B 27/14; B25J 15/0033; B25J 15/00
See application file for complete search history.

(56) References Cited

U.S. PATENT DOCUMENTS

D415,280 S  *  10/1999  Coburn ......................... D24/128
D538,117 S  *   3/2007  Lin ................................ D8/18
(Continued)

*Primary Examiner* — Lee D Wilson
(74) *Attorney, Agent, or Firm* — Norman E. Lehrer

(57) ABSTRACT

A tool (10) for assisting an optician in removing lenses (42) from or inserting lenses into eyeglass frames (44) includes an elongated block of substantially rigid material (12) having a forward working end (14) and a rearward free end (16) opposite the working end, the portion between the free end and the working end functioning as a handle to be grasped by a person's hand. A first recess (24) is formed in the bottom surface (22) of the block along with a first curved surface (26) and a first hook (28). The first curved surface includes a rearward facing pointed edge (27). Similarly, a second recess (36) is formed in the top surface (20) of the block along with a second curved surface (38) and a second hook (40). The hooks (28, 40) are adapted to rest against the edge (46) of the frame (44) as the pointed edge (27) or the second curved surface (38) presses the lens (42) out of or into the frame (44) as the free end (16) of the tool is rotated.

5 Claims, 3 Drawing Sheets

(51) Int. Cl.
    *B25B 27/02*     (2006.01)
    *B25J 15/00*     (2006.01)
    *G02C 1/06*     (2006.01)
    *B29L 11/00*     (2006.01)
    *B29L 12/00*     (2006.01)

(52) U.S. Cl.
    CPC ..... *G02C 13/001* (2013.01); *B29L 2011/0016* (2013.01); *B29L 2012/005* (2013.01); *G02C 1/06* (2013.01)

(56) References Cited

U.S. PATENT DOCUMENTS 7,827,884 B2 * 11/2010 Lawson .................... B67B 7/44
                                                                        81/3.09
2020/0183191 A1 * 6/2020 Rubin .................. G02C 13/001

* cited by examiner

OPTICIAN'S TOOL AND METHOD FOR REMOVING OR INSERTING LENSES

TECHNICAL FIELD

The present invention is directed toward a tool for opticians that is designed to assist them in removing lenses from or inserting lenses into eyeglass frames and to a method of using the tool.

BACKGROUND ART

Eyeglasses are comprised essentially of frames and lenses. Normally, a person chooses his or her frames and an optician grinds or otherwise prepares lenses in accordance with the person's prescription as determined by an optometrist. The lenses are then forced into the frames from the front.

Should a person's prescription change but the person wishes to continue to utilize his or her existing frames, the old lenses must be forced forwardly out of the frames by the optician. The new lenses are then forced into the frames from the front thereof.

When an optician inserts lenses into eyeglass frames or removes lenses from frames, he or she holds the frames with both hands around the lens openings and with his or her thumbs pushes the lens into or out of the frame. This frequently requires substantial force and repetitively doing so can cause injuries to the optician's thumbs. Furthermore, should the optician have a preexisting hand problem or develop a problem, it becomes difficult, if not impossible, to apply enough force to insert or remove the lenses.

To Applicant's knowledge, there is no tool or device available in the marketplace to assist an optician in inserting or removing lenses. Furthermore, to Applicant's knowledge, there is no patent or other literature describing such a tool or device.

SUMMARY OF THE INVENTION

The present invention is designed to overcome the deficiencies of the prior art discussed above. It is, therefore, an object of the present invention to provide a tool that makes an optician's work easier.

It is another object of the present invention to provide such a tool that assists an optician in removing a lens from an eyeglass frame.

It is a still further object of the present invention to provide such a tool that assists an optician in inserting a lens into an eyeglass frame.

In accordance with the illustrative embodiments demonstrating features and advantages of the present invention, there is provided a tool for assisting an optician in removing lenses from or inserting lenses into eyeglass frames which includes an elongated block of substantially rigid material having a forward working end and a rearward free end opposite the working end. The portion between the free end and the working end functions as a handle to be grasped by a person's hand. A first recess is formed in the bottom surface of the block along with a first curved surface and a first hook. The first curved surface includes a rearward facing pointed edge. Similarly, a second recess is formed in the top surface of the block along with a second curved surface and a second hook. The hooks are adapted to rest against the edge of the frame as the pointed edge or the second curved surface press the lens out of or into the frame as the free end of the tool is rotated.

Other objects, features, and advantages of the invention will be readily apparent from the following detailed description of the preferred embodiment thereof taken in conjunction with the drawings.

DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
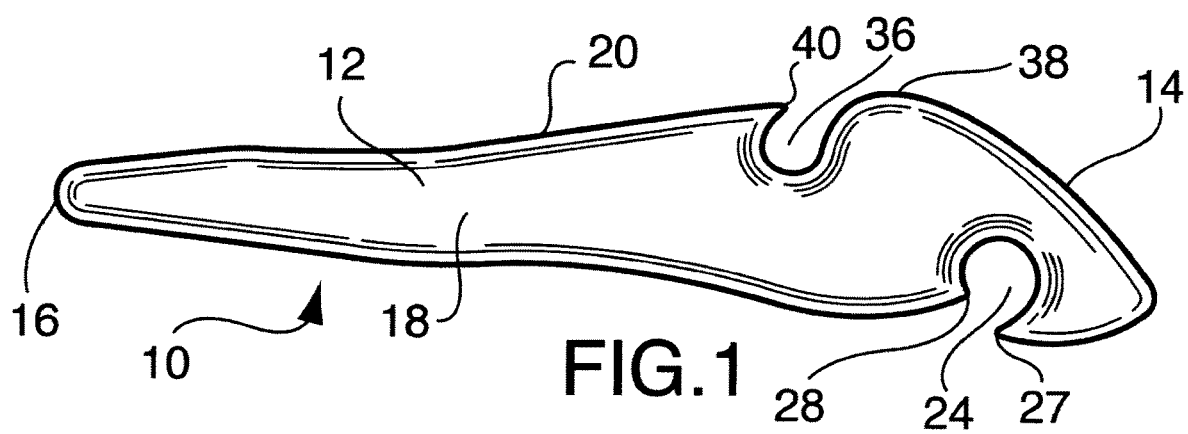
FIG. 1 is a front elevation view of the optician's tool of my invention, the rear elevation being the mirror image thereof.
Figure 2:
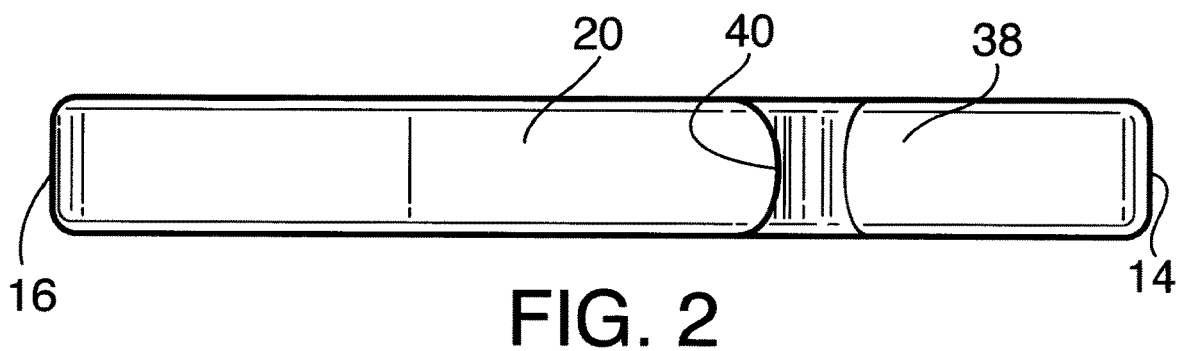
FIG. 2 is a top plan view thereof.
Figure 3:
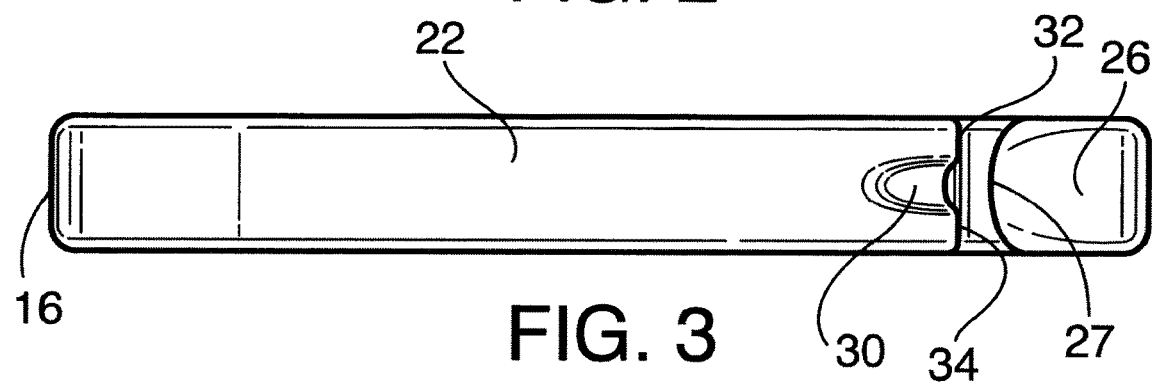
FIG. 3 is a bottom plan view.
Figure 4:
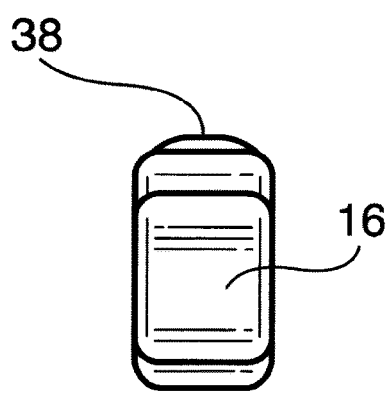
FIG. 4 is a left end elevation view.
Figure 5:
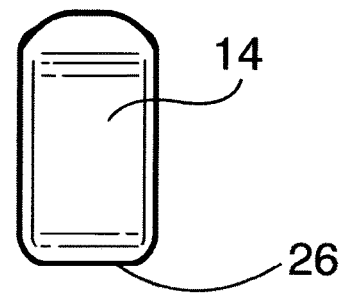
FIG. 5 is a right end elevation view.

Referring now to the drawings in detail wherein like reference numerals have been used throughout the various figures to designate like elements, there is shown in FIGS. 1-9 a tool for assisting opticians in removing lenses from or inserting lenses into eyeglass frames and which is constructed in accordance with the principles of the present invention and designated generally as 10. The tool 10 is preferable made from a somewhat rigid plastic material and is of a size which fits easily into a person's hand as shown in FIGS. 6-9.

As shown in FIG. 1, the tool 10 closely resembles a bottle opener or, more accurately, a compound or double bottle opener. It includes a block 12 of substantially rigid material such as plastic or the like. It has a forward working end 14 and a rearward free end 16 at the extreme opposite end of the tool. The area 18 in between the two ends functions as a handle and, as pointed out above, is of such size and shape to be grasped by a person's hand. The tool 10 has a top surface 20 (as viewed in FIG. 1) and a bottom surface 22.

A first recess or opening 24 is formed in the bottom surface 22 adjacent the working end 14 of the block 12. In front of the recess 24 is a first downwardly facing curved surface 26. The rearward part of the first curved surface includes a rearward facing pointed edge 27. Located behind the recess 24 and the curved surface 26 is a first forwardly facing hook 28. The hook 28 preferably has its center section 30 removed so as to be bifurcated and forming spaced apart hook sections 32 and 34.

Located on the top surface 20, but more rearward than the first recess 24, is a second recess 36. Located in front of the recess 36 is a second curved surface 38 that extends upwardly. Behind the recess 36 is a second hook 40 that extends or faces forwardly.

Figure 6:
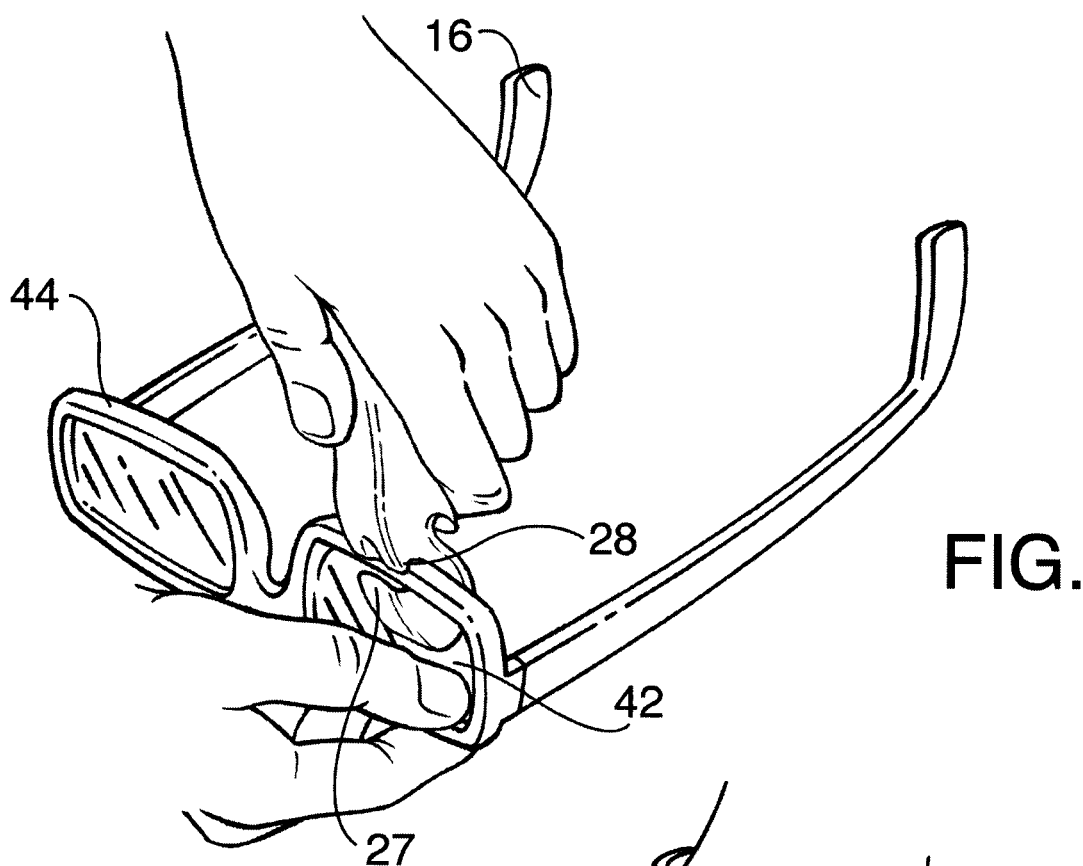
FIGS. 6 and 7 are perspective views showing how the tool is used to remove a lens from a frame.
Figure 7:
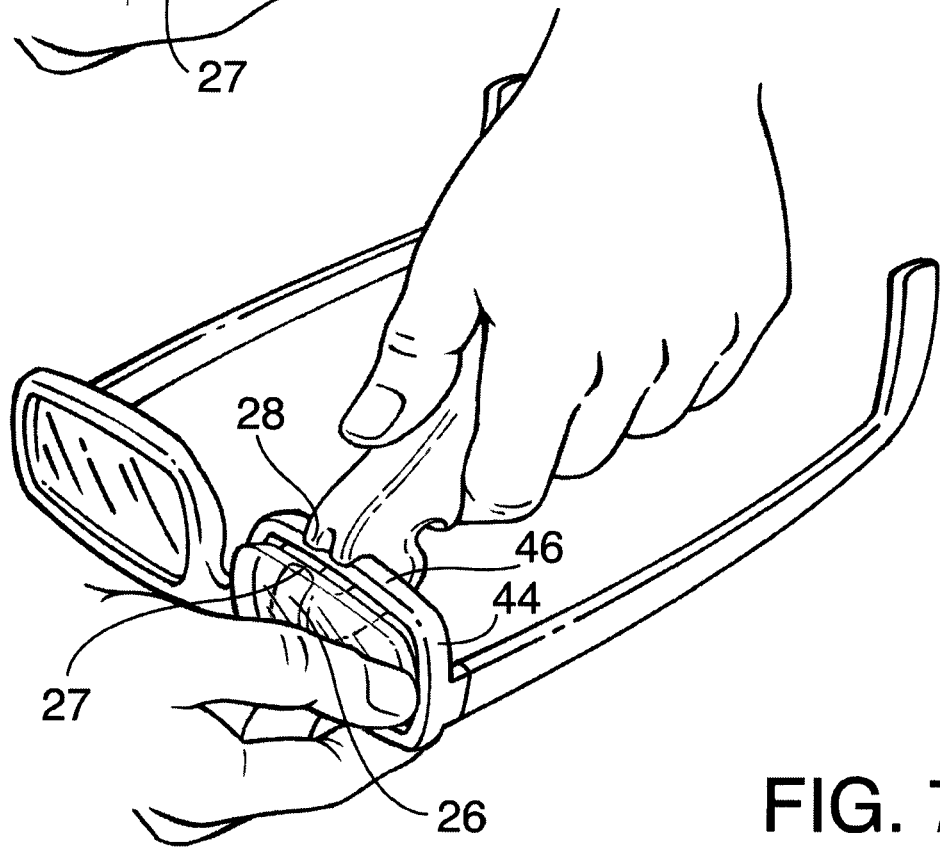

FIG. 6 shows how the tool 10 is used to remove a lens 42 from an eyeglass frame 44. As shown, the optician holds the frame with one hand while holding the handle 12 of the tool 10 with the other. The pointed edge 27 of the first curved surface 26 is placed behind the lens with the first hook 28 resting on the front outer edge 46 of the frame 44. In this position, the periphery of the frame 44 surrounding the lens 42 lies within the first recess or opening 24 of the tool.

With the tool 10 in place as described, the optician moves the handle 12 downwardly or behind the frame 44. Since the projection or hook 28 is resting on the frame, the pointed edge 27 of the tool pushes on the lens 42 forcing the same outwardly as shown in FIG. 6.

Figure 8:
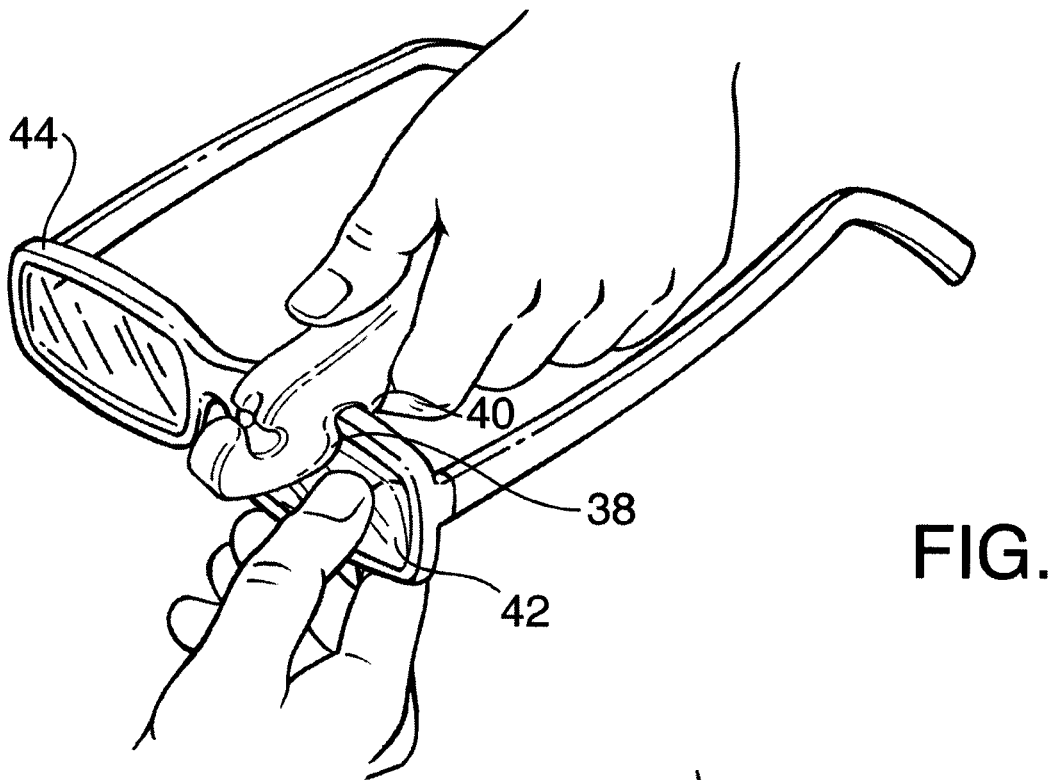
FIGS. 8 and 9 are perspective views showing how the tool is used to insert a lens into a frame.
Figure 9:
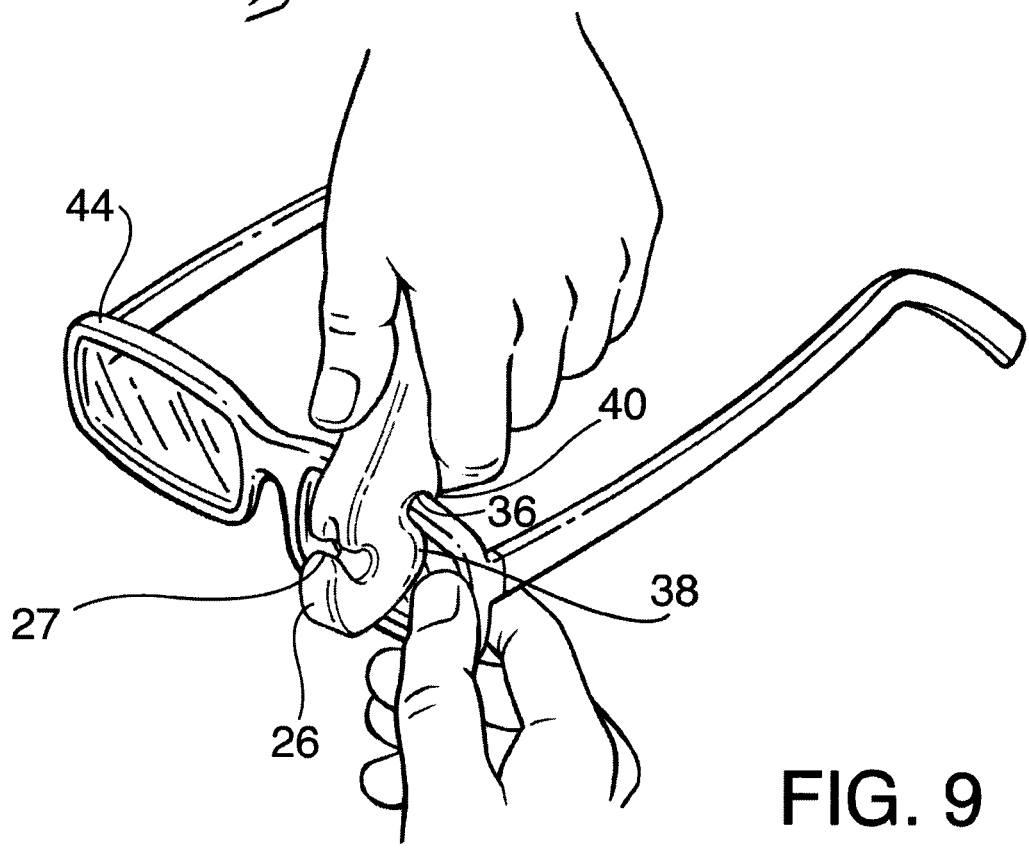

As shown in FIGS. 8 and 9, a lens is inserted into the frame in exactly the opposite manner utilizing the second hook 40 and the second curved surface 38. That is, the tool is reversed so that the hook or projection 40 rests on the back side of the frame 44 and the second curved surface 38 forces the lens 42 into the frame from the front thereof as the optician lifts the free end 16 of the tool 10.

In the preferred embodiment of the invention, the tool 10 is made of plastic and is molded or machined in one piece. This is, of course, by way of example only. It is not beyond the scope of the invention to make the tool in more than one piece and then assemble them. The tool 10 could also be made of different materials such as aluminum or substantially any material that can withstand the forces involved. If made of materials that may scratch or mar the surface of a lens or frame, the tool, or any portion thereof, could be covered with a material that would prevent scratching or marring of the lens or frame.

With the present invention, the optician need not utilize his or her thumbs to push on the lens. His or her hands are needed merely to hold the frame relatively gently while pushing the end of the handle downwardly or upwardly to force the lens into or out of the frame.

As should be readily apparent to those skilled in the art, the sizes and shapes of the working part of the tool can be varied as needed. Thicker lenses and/or frames, for example, may require more space between the hook and bulbous or curved portions of the tool and/or may require a larger opening or deeper opening between these two parts. Increasing the length of the handle will also increase the leverage and, therefore, reduce the force needed to operate the tool.

The present invention may be embodied in other specific forms without departing from the spirit or essential attributes thereof and accordingly, reference should be made to the appended claims rather than to the foregoing specification as indicating the scope of the invention.

The invention claimed is:

1. A tool for assisting an optician in removing lenses from or inserting lenses into eyeglass frames comprising:
   an elongated block of substantially rigid material having a forward working end and a rearward free end opposite said working end, the portion of said tool between said free end and said working end functioning as a handle and being of such size and shape so as to be capable of being grasped by a person's hand;
   said block further having a top surface and a bottom surface opposite said top surface;
   a first hook formed in said bottom surface, said first hook facing essentially forwardly toward said working end;
   a first curved surface formed on said bottom surface, said first curved surface including a rearward facing pointed edge;
   a first recess formed in said bottom surface, said first recess being located between said first hook and said pointed edge;
   a second curved surface formed on said top surface;
   a second hook formed in said top surface, said second hook facing essentially forwardly toward said working end, and
   a second recess formed in said top surface, said second recess being located between said second curved surface and said second hook.

2. The tool for assisting an optician in removing lenses from or inserting lenses into eyeglass frames as claimed in claim 1 wherein said second recess, said second hook and said second curved surface are located more rearward than said first recess, said first hook and said first curved surface.

3. The tool for assisting an optician in removing lenses from or inserting lenses into eyeglass frames as claimed in claim 1 wherein at least one of said hooks is bifurcated thereby forming two spaced apart hook sections.

4. A method of removing a lens from an eyeglass frame comprising the steps of:
   providing a tool having a handle with a rear free end and a forward working end, said handle including a recess therein adjacent said working end, a hook on the rear side of said recess facing forward and a pointed edge on the forward side of said recess facing rearward;
   placing said recess over the frame of the eyeglasses with the hook resting on the outer part of the frame and the pointed edge resting against the inner surface of the lens, and
   rotating the free end of said tool whereby said pointed edge forces said lens out of said frame.

5. A method of inserting a lens into an eyeglass frame comprising the steps of:
   providing a tool having a handle with a rear free end and a forward working end, said handle including a recess therein adjacent said working end, a hook on the rear side of said recess facing forward and a curved surface located on the forward side of said recess;
   placing a lens over the lens opening in the frame;
   placing said recess over the frame of the eyeglasses with the hook resting on the inner part of the frame and the curved surface resting against the outer surface of the lens, and
   rotating the free end of said tool whereby said curved surface forces said lens into said frame.

* * * * *